United States Patent [19]

Jessen

[11] 4,233,873
[45] Nov. 18, 1980

[54] PERMANENT MAGNETIC HOLD DOWN FOR STEEL RULE DIES

[75] Inventor: Kenneth C. Jessen, Loveland, Colo.

[73] Assignee: Hewlett-Packard Company, Palo Alto, Calif.

[21] Appl. No.: 957,953

[22] Filed: Nov. 6, 1978

[51] Int. Cl.³ .............................. B26F 1/44; B26D 7/26
[52] U.S. Cl. ............................................. 83/652; 83/696; 83/697; 83/620; 83/698; 76/107 C; 83/701
[58] Field of Search ................... 83/620, 696, 697, 657, 83/652, 639, 619, 698, 699, 701; 76/107 C; 7/901

[56] References Cited

U.S. PATENT DOCUMENTS

| 2,959,832 | 11/1960 | Baermann | 7/901 |
| 3,256,753 | 6/1966 | Dasse et al. | 76/107 C |
| 3,826,170 | 7/1974 | Jones et al. | 83/652 X |

Primary Examiner—Donald R. Schran
Attorney, Agent, or Firm—William E. Hein; John A. Frazzini

[57] ABSTRACT

Basic steel rule dies are provided which can be combined to produce a variety of die cut patterns. Each basic die contains sufficient magnetic material to hold it in place on a steel chase during the cutting operation.

3 Claims, 4 Drawing Figures

PERMANENT MAGNETIC HOLD DOWN FOR STEEL RULE DIES

BACKGROUND AND SUMMARY OF THE INVENTION

This invention relates to pattern cutting processes employing steel rule dies. Traditional die cutting machines contain a steel chase and a flat steel bedplate. The die itself is clamped or screwed to the chase. The material to be die cut is inserted between the chase and bedplate and, when activated, the chase and bedplate come together to force the die through the material.

One of the more widely used dies is a steel rule die commonly employed to cut a variety of materials such as foam, cardboard, leather, and plastics. A well known type of steel rule die comprises steel blades embedded in a die board member that may comprise, for example, maple plywood. Typically, steel rule dies are formed singularly and are as large as the area to be cut. Unfortunately, if changes are required in any portion of the die cut pattern, a new steel rule die must be fabricated.

In accordance with the illustrated preferred embodiments of the present invention, a basic steel rule die is described that can be easily attached to a steel chase. Each die contains magnetic material to hold it in place on the steel chase by magnetic attraction. The basic dies can be arranged to form a variety of overall patterns. The overall die cut pattern may thus be easily altered without the necessity of fabricating a die that is dedicated to the changed overall pattern.

DESCRIPTION OF THE PREFERRED EMBODIMENT

Figure 1:
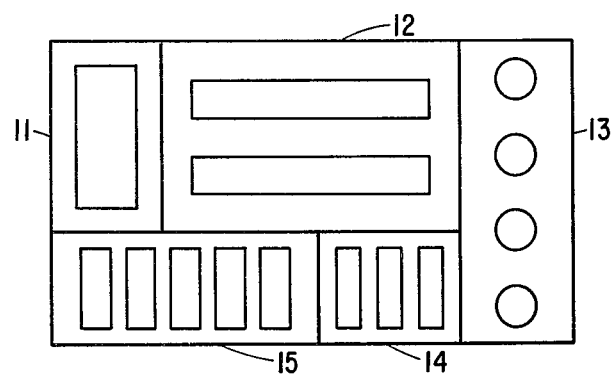
FIG. 1 illustrates a typical die cut pattern formed from five basic dies.

In a typical die cutting operation, the dies are made in one piece and are as large as the area to be cut. If changes are needed in the die cut pattern, then a new steel rule die is required. This invention provides basic dies which can be easily mounted on a steel chase and arranged to form a variety of patterns. FIG. 1 shows a typical die cut pattern formed from the basic dies 11, 12, 13, 14, and 15. The patterns can be easily altered by rearranging or replacing some of the basic dies forming the pattern.

Figure 2A:
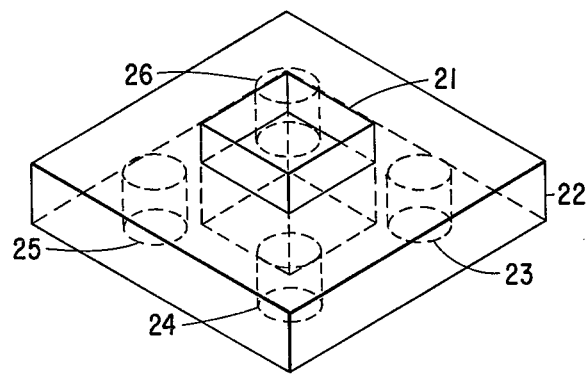
FIG. 2A is a perspective view of a typical basic die employing plugs of magnetic material for holding the die in place on a steel chase.

In FIG. 2A there is shown a typical basic die. Steel rule blades 21 are embedded in a piece of die board 22. The blades are embedded perpendicular to a surface of the board to form a basic die cut pattern. Magnetic rods 23, 24, 25, and 26 are embedded in the die board to hold the die board to a steel chase by means of magnetic attraction. During actual cutting operations, the cutting force against the sharp edges of the steel rule blades is perpendicular to the surface of the chase. Thus, there is only a negligible lateral force exerted on the die so that the sufficiency of the magnetic force holding the die in place on the steel chase is not a problem. Any slight lateral drift in the position of the basic dies can be periodically corrected by the operator of the die cutting machine.

Figure 2B:
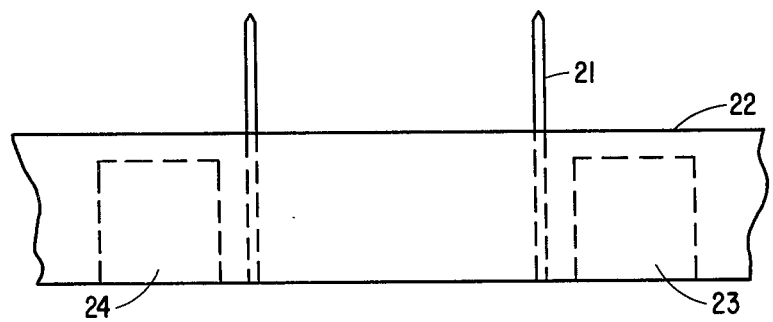
FIG. 2B is a side view of the basic die illustrated in FIG. 2A.
Figure 3:
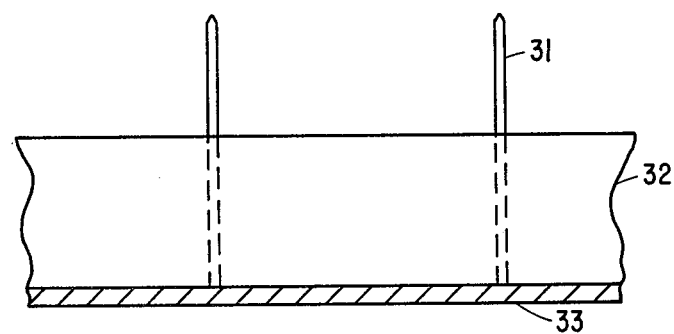
FIG. 3 illustrates a basic die employing a sheet of magnetic material for holding the die in place on a steel chase.

Magnetic rods 23, 24, 25, and 26 may be cut from standard bar stock. As shown in FIG. 2B, the rods are typically counter sunk into the die board such that their bottom surfaces are flush with the bottom of the die. Alternatively, as shown in FIG. 3, a sheet of magnetic material fastened to the bottom of the die may be employed to provide the required magnetic force for holding the die in place on the sheet chase. In general, all that is required is that each basic die contain sufficient magnetic material to hold the die in place. The amount of magnetic material required may vary as a function of the type of material to be cut, etc. For cutting soft foam material, it has been found that four magnetic plugs, each $\frac{1}{4}''$ in length and diameter, are sufficient to hold a 3" square basic die in place.

I claim:

1. A steel rule die assembly for attachment to a steel chase, the steel rule die assembly comprising:
   a generally flat non-magnetic die board member having top and bottom surfaces;
   a steel rule blade embedded in the die board member, the steel rule blade being embedded perpendicular to the top surface of the die board member such that a cutting edge of the steel rule blade partially extends from the top surface of the die board member to define a die cut pattern; and
   a permanent magnet member fixedly attached to the die board member for holding the steel rule die assembly in a predetermined position on the steel chase.

2. A steel rule die assembly as in claim 1 wherein the permanent magnet member comprises a plurality of permanent magnet plugs imbedded within the die board member such that a surface of each permanent magnet plug is flush with the bottom surface of the die board member.

3. A steel rule die assembly as in claim 1 wherein the permanent magnet material comprises a sheet of permanent magnet material attached to the bottom surface of the die board member.

* * * * *